(12) United States Patent
Chiba

(10) Patent No.: US 12,447,962 B2
(45) Date of Patent: Oct. 21, 2025

(54) VEHICLE CONTROL APPARATUS CONTROLLING AN OWN VEHICLE BASED ON DETECTION OF A CUT-IN VEHICLE

(71) Applicant: TOYOTA JIDOSHA KABUSHIKI KAISHA, Toyota (JP)

(72) Inventor: Takashi Chiba, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 18/538,731

(22) Filed: Dec. 13, 2023

(65) Prior Publication Data

US 2024/0239342 A1    Jul. 18, 2024

(30) Foreign Application Priority Data

Jan. 13, 2023  (JP) .................................. 2023-003583

(51) Int. Cl.
| | |
|---|---|
| *B60W 30/16* | (2020.01) |
| *B60W 30/09* | (2012.01) |
| *B60W 30/095* | (2012.01) |
| *B60W 50/00* | (2006.01) |

(52) U.S. Cl.
CPC .......... *B60W 30/162* (2013.01); *B60W 30/09* (2013.01); *B60W 30/0953* (2013.01); *B60W 30/0956* (2013.01); *B60W 50/0097* (2013.01); *B60W 2554/4045* (2020.02); *B60W 2554/4046* (2020.02); *B60W 2554/802* (2020.02); *B60W 2554/804* (2020.02)

(58) Field of Classification Search
CPC .............. B60W 30/162; B60W 30/09; B60W 30/0953; B60W 30/0956; B60W 50/0097; B60W 2554/4045; B60W 2554/4046; B60W 2554/802; B60W 2554/804
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 11,294,396 | B2 * | 4/2022 | Switkes ............... G05D 1/0293 |
| 2019/0295419 | A1 | 9/2019 | Tosa et al. |

FOREIGN PATENT DOCUMENTS

| | | | | |
|---|---|---|---|---|
| CN | 105501224 | * | 9/2015 | ............ G01S 13/04 |
| JP | 11-321379 | A | 11/1999 | |

* cited by examiner

*Primary Examiner* — Brodie J Follman
(74) *Attorney, Agent, or Firm* — Sughrue Mion, PLLC

(57) ABSTRACT

The vehicle control apparatus includes a cut-in detection unit for detecting a cut-in vehicle from an adjacent lane in front of a front vehicle traveling in front of an own vehicle, a deceleration prediction unit for predicting whether deceleration occurs in the front vehicle, and a travel control unit for performing acceleration suppression control or deceleration control of the own vehicle when it is predicted that deceleration occurs.

3 Claims, 3 Drawing Sheets

VEHICLE CONTROL APPARATUS CONTROLLING AN OWN VEHICLE BASED ON DETECTION OF A CUT-IN VEHICLE

CROSS-REFERENCE TO RELATED APPLICATIONS

This application is based upon and claims the benefit of priority from Japanese Patent Application No. 2023-003583, filed on Jan. 13, 2023. The entire contents of which are incorporated herein by reference.

BACKGROUND

Field

The present disclosure relates to a vehicle control apparatus that controls traveling of an own vehicle.

Description of the Related Art

A vehicle may cut into an own lane on which the own vehicle travels from an adjacent lane. For example, JPH11-321379A describes an apparatus that performs deceleration control of an own vehicle when detecting a vehicle that cuts in between a preceding vehicle existing immediately before the own vehicle and the own vehicle.

SUMMARY

Here, for example, a vehicle may cut in from an adjacent lane in front of a front vehicle that travels in front of an own vehicle in an own lane. Due to this cut-in, the front vehicle may be decelerated and the own vehicle may also need to be decelerated. However, the device described in JPH11-321379A is configured to perform control based on a vehicle that cuts-in between an own vehicle and a front vehicle. Therefore, it is difficult for this apparatus to cope with a vehicle which cuts in front of the front vehicle.

Accordingly, the present disclosure describes a vehicle control apparatus capable of controlling travel of an own vehicle by more appropriately predicting deceleration of a front vehicle when a cut-in vehicle cuts in front of the front vehicle traveling in front of the own vehicle.

According to an aspect of the present disclosure, a vehicle control apparatus includes a front vehicle recognition unit configured to recognize a vehicle in front of an own vehicle, a cut-in detection unit configured to detect a cut-in vehicle in front of the own vehicle in the own lane based on a recognition result of the front vehicle recognition unit, and a travel control unit configured to perform acceleration suppression control or deceleration control of the own vehicle when the deceleration is predicted to occur by the deceleration prediction unit. When a speed difference obtained by subtracting the speed of the cut-in vehicle from the speed of the front vehicle, is greater than or equal to a predetermined cut-in speed threshold, and an inter-vehicle distance between the cut-in vehicle and the front vehicle is less than or equal to a predetermined cut-in distance threshold, the deceleration prediction unit predicts that deceleration will occur in the front vehicle.

In the vehicle control apparatus, the front vehicle may include a plurality of vehicles running side by side along an extension direction of an own lane, and the deceleration prediction unit may decrease the cut-in speed threshold or increase the cut-in distance threshold when the number of vehicles included in the front vehicle is large as compared to when the number of vehicles is small.

According to one aspect of the present disclosure, when a cut-in vehicle cuts in front of a front vehicle traveling in front of an own vehicle, it is possible to more appropriately predict deceleration of the front vehicle and control traveling of the own vehicle.

DETAILED DESCRIPTION

In the following description, with reference to the drawings, the same reference numbers are assigned to the same components or to similar components having the same function, and overlapping description is omitted.

Figure 1:
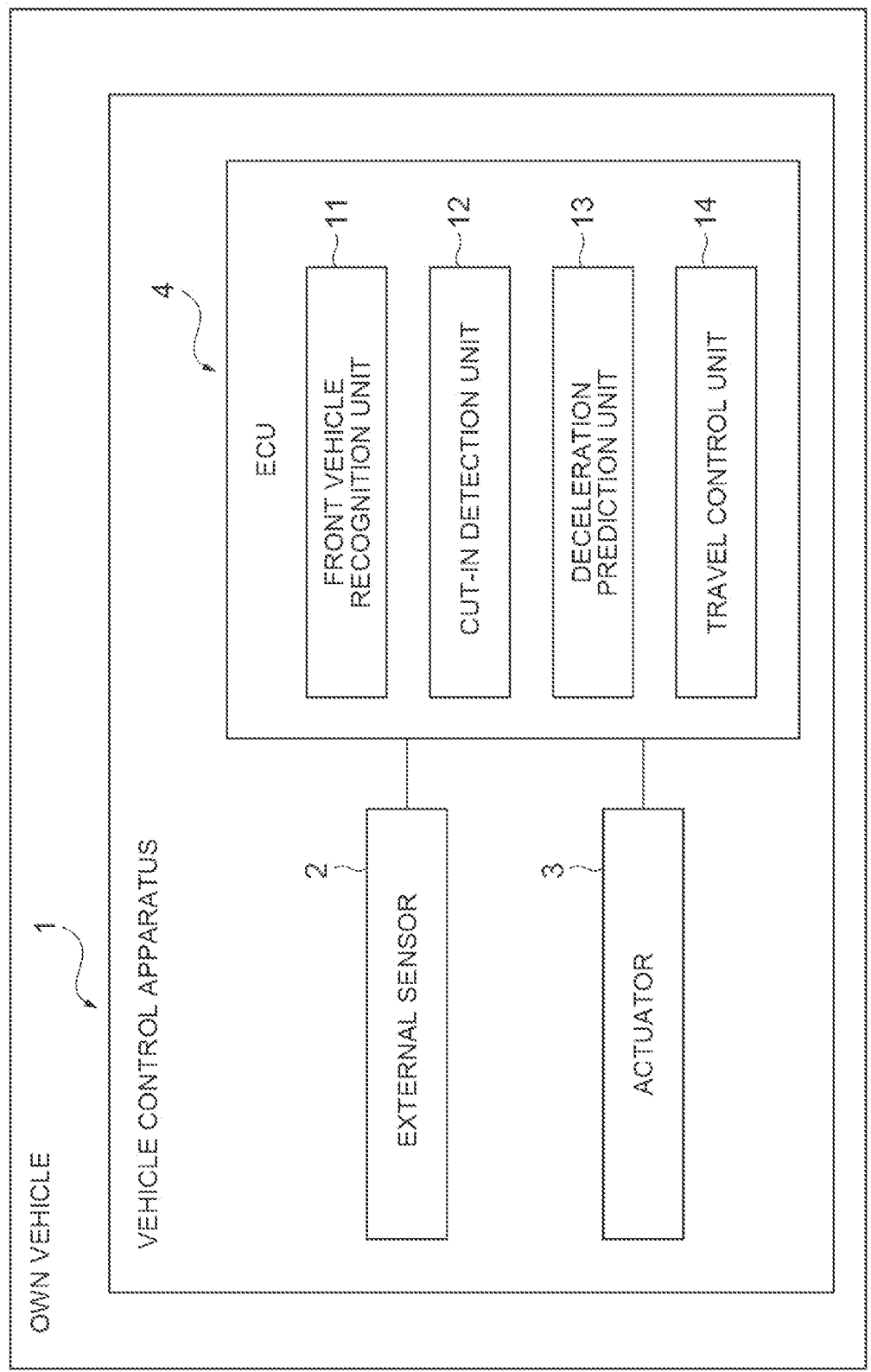
FIG. 1 is a block diagram illustrating an example of a vehicle control apparatus according to an embodiment.
Figure 2:
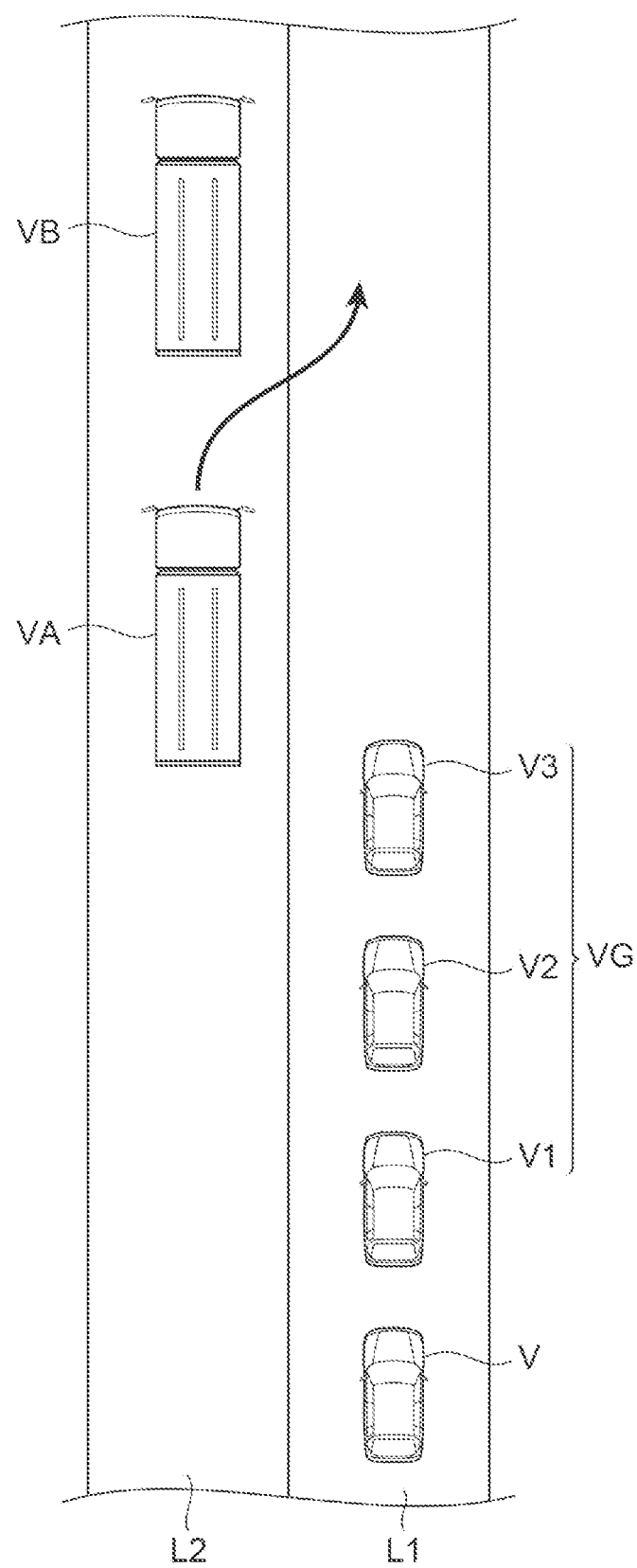
FIG. 2 is a schematic view showing a state in which a cut-in vehicle cuts in in front of a front vehicle.

As shown in FIGS. 1 and 2, a vehicle control apparatus 1 controls the travel of an own vehicle V based on a cut-in vehicle VA that cuts in from an adjacent lane L2 onto an own lane L1 where the own vehicle V travels. The own vehicle V can automatically travel following the vehicle in front. The own vehicle V may be an autonomous driving vehicle.

Here, a front vehicle VG runs in front of the own vehicle V on the own lane L1. In the present embodiment, the front vehicle VG is constituted by a first preceding vehicle V1, a second preceding vehicle V2, and a third preceding vehicle V3 running side by side along the extension direction of the own lane L1. The first preceding vehicle V1 is running in a position immediately in front of the own vehicle V. The second preceding vehicle V2 is running in a position immediately in front of the first preceding vehicle V1. The third preceding vehicle V3 is running in a position immediately in front of the second preceding vehicle V2. The cut-in vehicle VA cuts in prior to the front vehicle VG from the adjacent lane L2, for example to overtake a vehicle VB running on the adjacent lane L2.

In the present embodiment, a case where the front vehicle VG is constituted by three vehicles will be described as an example. However, the number of vehicles constituting the front vehicle VG is not limited to three. The front vehicle VG may include only one vehicle. In a case where one vehicle constitutes the front vehicle VG, the vehicle becomes a leading vehicle of the front vehicle VG and also becomes a rearmost vehicle of the front vehicle VG.

The vehicle control apparatus 1 includes an external sensor 2, an actuator 3, and ECU4 [Electronic Control Unit]. The external sensor 2 is a detector that detects objects around the own vehicle V. The external sensor 2 includes, for example, a camera, a millimeter wave radar, and a light detection and ranging (LIDAR). And the like may be included. The actuator 3 is a controller for controlling the speed of the own vehicle V. The actuator 3 may include, for example, an actuator that controls output of an engine or a motor, and a brake actuator.

The ECU4 is an electronic control unit having, for example, a CPU [Central Processing Unit], ROM [Read Only Memory], RAM [Random Access Memory], and the like. For example, the ECU4 loads a program stored in the ROM into the RAM. The ECU4 realizes various functions by executing the program loaded into the RAM by the CPU.

The ECU4 may be comprised of a plurality of electronic control units. ECU4 functionally includes a front vehicle recognition unit 11, a cut-in detection unit 12, a deceleration prediction unit 13, and a travel control unit 14.

The front vehicle recognition unit 11 recognizes the vehicle in front of the own vehicle V. In the present embodiment, the front vehicle recognition unit 11 recognizes a vehicle traveling on the own lane L1 and the adjacent lane L2 in front of the own vehicle V based on the external sensor 2 detection result. In the example shown in FIG. 2, the front vehicle recognition unit 11 recognizes at least the front vehicle VG (the first preceding vehicle V1, the second preceding vehicle V2, and the third preceding vehicle V3) and the cut-in vehicle VA. Note that the front vehicle recognition unit 11 is not limited to recognizing the vehicle ahead based on the detection result of the external sensor 2. For example, the front vehicle recognition unit 11 may recognize a vehicle in front by performing vehicle-to-vehicle communication with a surrounding vehicle.

Further, the front vehicle recognition unit 11 recognizes the vehicle class of the recognized vehicle. Here, the front vehicle recognition unit 11 recognizes at least the vehicle class of the cut-in vehicle VA running on the adjacent lane L2.

Based on the front vehicle recognition unit 11 recognition result, the cut-in detection unit 12 detects a cut-in vehicle from the adjacent lane L2 in front of a front vehicle traveling in front of the own vehicle V on the own lane L1. In the example shown in FIG. 2, the cut-in detection unit 12 detects the cut-in vehicle VA in front of the front vehicle VG. For example, the cut-in detection unit 12 may determine whether the vehicle is cutting in based on known technology. For example, the cut-in detection unit 12 may determine a cut-in based on the recognition result of the vehicle traveling on the adjacent lane L2 and the recognition result of the lane line. For example, the cut-in detection unit 12 may determine a cut-in using a recognition result and map information of a vehicle traveling on the adjacent lane L2.

The deceleration prediction unit 13 predicts whether deceleration will occur in the front vehicle VG if the cut-in vehicle VA cuts in front of the front vehicle VG. Here, as the speed difference between the cut-in vehicle VA and the leading vehicle (the third preceding vehicle V3) of the front vehicle VG is larger and the inter-vehicle distance is shorter, there is a higher possibility that the rearmost vehicle (the first preceding vehicle V1) of the front vehicle VG decelerates. Therefore, the deceleration prediction unit 13 predicts whether deceleration will occur in the front vehicle VG based on the speed difference and the inter-vehicle distance between the front vehicle VG traveling in front of the own vehicle V on the own lane L1 and the cut-in vehicle VA detected by the cut-in detection unit 12.

More specifically, the deceleration prediction unit 13 predicts that deceleration will occur in the front vehicle VG if the following conditions (1) and (2) are met:

Condition (1): A speed difference obtained by subtracting the speed of the cut-in vehicle VA from the speed of the front vehicle VG is equal to or greater than a predetermined cut-in speed threshold.

Condition (2): An inter-vehicle distance between the cut-in vehicle VA and the front vehicle VG is equal to or less than a predetermined cut-in distance threshold.

In the condition (1), the speed of the front vehicle VG to be compared with the speed of the cut-in vehicle VA is the speed of leading vehicle (the third preceding vehicle V3) of the front vehicle VG. In the condition (2), the inter-vehicle distance between the cut-in vehicle VA and the front vehicle VG is the distance between the cut-in vehicle VA and the leading vehicle (the third preceding vehicle V3) in the front vehicle VG along the extension direction of the own lane L1. The deceleration prediction unit 13 can obtain the speeds of the cut-in vehicle VA and the front vehicle VG by a known method based on the recognition results of the front vehicle recognition unit 11. In addition, the deceleration prediction unit 13 may acquire an inter-vehicle distance between the cut-in vehicle VA and the front vehicle VG by a known method based on a recognition result of the front vehicle recognition unit 11.

Here, the inter-vehicle distance between the front vehicle VG's the first preceding vehicle V1 and the own vehicle V may be long. In this case, even if the rearmost vehicle suddenly decelerates, the own vehicle V may not decelerate or may decelerate to such an extent that the occupant (driver or the like) in the own vehicle V does not feel the sudden deceleration.

Therefore, the deceleration prediction unit 13 can predict whether or not deceleration will occur in the front vehicle VG in consideration of the following condition (3) in addition to the above conditions (1) and (2). That is, the deceleration prediction unit 13 can predict that deceleration will occur in the front vehicle VG if all of the above conditions (1) and (2) and the following condition (3) are satisfied.

Condition (3): An inter-vehicle distance between the front vehicle VG and the own vehicle V is equal to or less than a predetermined forward distance threshold.

In the condition (3), the inter-vehicle distance between the front vehicle VG and the own vehicle V is the distance between the rearmost vehicle (the first preceding vehicle V1) of the front vehicle VG and the own vehicle V along the extension direction of the own lane L1. The deceleration prediction unit 13 determines the inter-vehicle distance between the front vehicle VG and the own vehicle V by a known method based on the recognition result of the front vehicle recognition unit 11.

The deceleration prediction unit 13 is a time-to-collision (TTC) between the front vehicle VG and the cut-in vehicle VA. May be used to predict whether or not deceleration will occur in the front vehicle VG. Here, by using the TTC, the condition (1) relating to the speed and the condition (2) relating to the distance can be collectively expressed as the following condition (4). In other words, the above conditions (1) and (2) and the following condition (4) have the same meaning.

Condition (4): TTC between the front vehicle VG and the cut-in vehicle VA is equal to or less than a predetermined TTC threshold value.

The TTC between the front vehicle VG and the cut-in vehicle VA is the TTC between the leading vehicle (the third preceding vehicle V3) of the front vehicle VG and the cut-in vehicle VA. When the above condition (4) is satisfied instead of the above conditions (1) and (2), the deceleration prediction unit 13 predicts that deceleration will occur in the front vehicle VG. The deceleration prediction unit 13 may predict whether or not deceleration will occur in the front vehicle VG in consideration of the condition (3) in addition to the condition (4).

In addition, in a case where the vehicle class of the cut-in vehicle VA is large, such as a case where the cut-in vehicle VA is a large vehicle, it takes time to perform the cut-in operation, and deceleration of the front vehicle VG is likely to occur. Therefore, when the vehicle class of the cut-in vehicle VA is large, the deceleration prediction unit 13 can change the threshold value of each of the above-described conditions so that it is more likely to predict that deceleration will occur in the front vehicle VG than when the vehicle class is small.

Here, when the vehicle class of the front vehicle VG is large, the deceleration prediction unit 13 performs at least one of decreasing the cut-in speed threshold of the above condition (1), increasing the cut-in distance threshold of the above condition (2), and increasing the forward distance threshold of the above condition (3) as compared to when the vehicle class is small. When the above condition (4) is used, the deceleration prediction unit 13 increases the TTC threshold value. Here, the deceleration prediction unit 13 may set each threshold value according to whether the vehicle class of the cut-in vehicle VA is a large vehicle or an ordinary vehicle having a smaller vehicle class than the large vehicle.

In addition, for example, as the vehicle becomes closer to the rear side in the front vehicle VG, the response to the deceleration performed by the leading vehicle due to the cut-in vehicle VA becomes slower. This becomes more conspicuous as the number of the front vehicle VG is larger. Therefore, the deceleration prediction unit 13 can change the threshold value of each of the above-described conditions so that the occurrence of deceleration in the front vehicle VG is more likely to be predicted when the number of vehicles constituting the front vehicle VG is large than when the number of vehicles constituting the shoulder is small.

Here, when the number of vehicles constituting the front vehicle VG is large, the deceleration prediction unit 13 performs at least one of decreasing the cut-in speed threshold of the above condition (1), increasing the cut-in distance threshold of the above condition (2), and increasing the forward distance threshold of the above condition (3) as compared to when the number of vehicles constituting the shoulder is small. When the above condition (4) is used, the deceleration prediction unit 13 increases the TTC threshold value.

The travel control unit 14 performs acceleration suppression control or deceleration control of the own vehicle V when it is predicted that deceleration occurs due to the deceleration prediction unit 13. The travel control unit 14 inhibits acceleration of the own vehicle V as an acceleration suppression control. The travel control unit 14 slows down the own vehicle V as a deceleration control. For example, the travel control unit 14 may perform acceleration suppression control or deceleration control by transmitting a control signal to the actuator 3.

For example, the travel control unit 14 may perform deceleration control such that the greater the speed difference between the front vehicle VG and the cut-in vehicle VA in the above condition (1) is, the greater the deceleration degree is. For example, the travel control unit 14 may perform deceleration control such that the reduction speed degree increases as the inter-vehicle distance between the cut-in vehicle VA and the front vehicle VG of the above condition (2) decreases. For example, the travel control unit 14 may perform deceleration control so that the reduction speed degree increases as the inter-vehicle distance between the front vehicle VG and the own vehicle V of the above condition (3) decreases.

Next, the flow of cut-in control processing performed by the vehicle control apparatus 1 when the cut-in vehicle VA cuts in in front of the front vehicle VG will be described with reference to the flowchart of FIG. 3. In the process shown in FIG. 3, when the process reaches the end, the process is started again from the start after a predetermined time. It is assumed that the front vehicle VG exists in front of the own vehicle V. In addition, here, as an example, it is assumed that the own vehicle V automatically travels following a vehicle (the first preceding vehicle V1 in the example illustrated in FIG. 2) traveling immediately in front of the own vehicle V.

Figure 3:
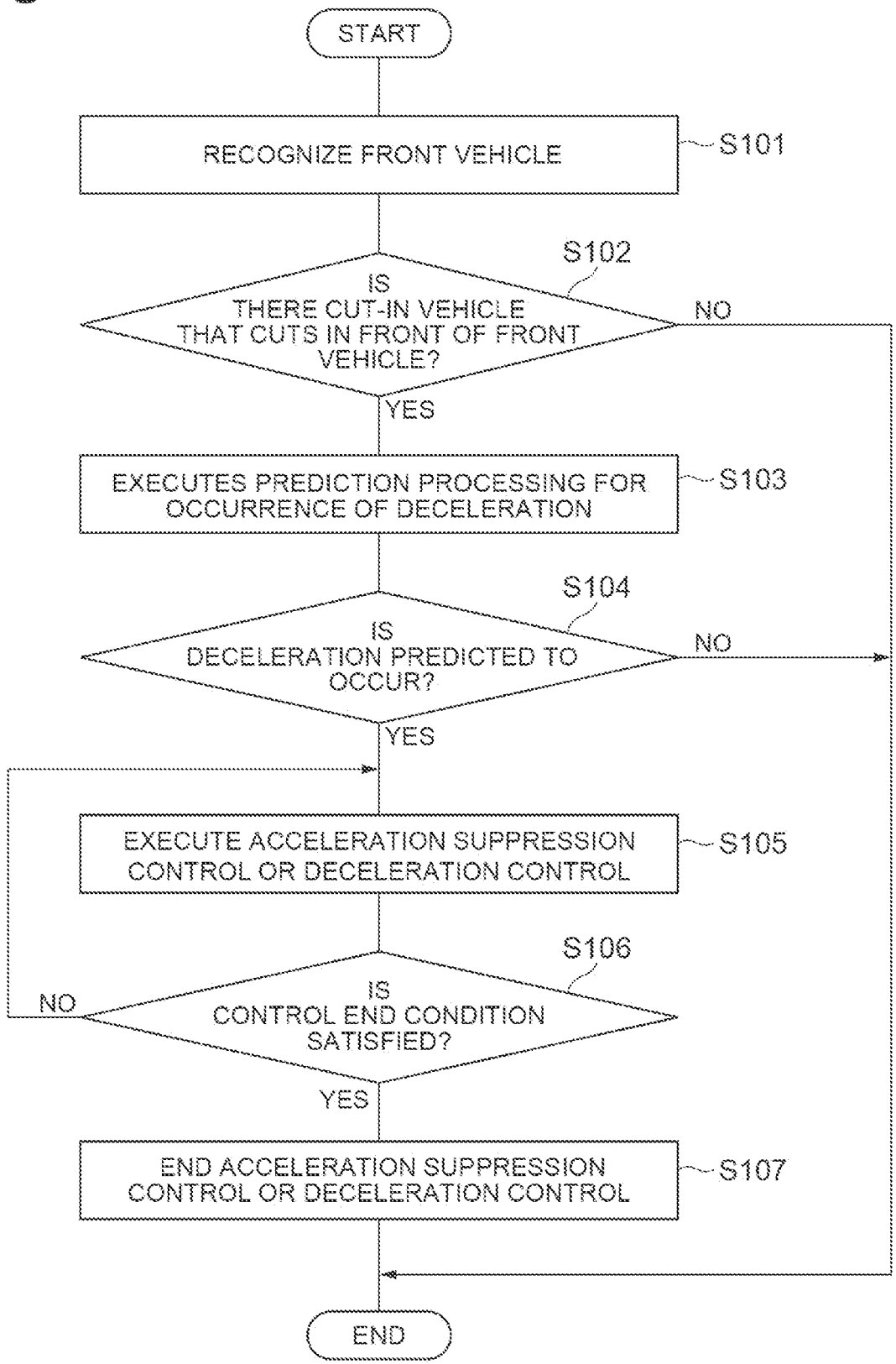
FIG. 3 is a flowchart showing the flow of cut in control processing performed in response to a cut-in vehicle.

As shown in FIG. 3, the front vehicle recognition unit 11 recognizes the vehicle in front of the own vehicle V (S101). The cut-in detection unit 12 detects the presence or absence of the cut-in vehicle VA cuts in from the adjacent lane L2 before the front vehicle VG (S102). When there is no cut-in vehicle VA (S102: NO), the vehicle control apparatus 1 restarts the process after a predetermined time. If the cut-in vehicle VA is present (S102: YES), the deceleration prediction unit 13 executes a process of predicting whether or not deceleration will occur in the front vehicle VG based on the above-described conditions (S103). The deceleration prediction unit 13 determines whether deceleration is predicted to occur (S104). When it is not predicted that deceleration will occur (S104: NO), the vehicle control apparatus 1 starts processing from start after a predetermined time.

If deceleration is predicted to occur (S104: YES), the travel control unit 14 performs acceleration suppression control or deceleration control (S105). Then, the travel control unit 14 determines whether or not the control end condition is satisfied (S106). Note that the control end condition here may be that the vehicle at the rear of the front vehicle VG (the first preceding vehicle V1) does not decelerate within a predetermined time from the occurrence of the cut-in of the vehicle VA, or that the vehicle at the rear of the front vehicle VG (the first preceding vehicle V1) starts acceleration.

When the control end condition is not satisfied (S106: NO), the travel control unit 14 executes the processing of the S105 until the control end condition is satisfied. When the control end condition ends (S106: YES), the travel control unit 14 ends the acceleration suppression control or deceleration control. Thus, in the own vehicle V, control for automatically traveling following the vehicle traveling immediately in front of the own vehicle V is resumed. Thereafter, the vehicle control apparatus 1 starts the processing from start after a predetermined time.

As described above, the vehicle control apparatus 1 detects a cut-in in the cut-in vehicle VA that cuts in in front of the front vehicle VG running in front of the own vehicle V, and performs acceleration suppression control or deceleration control of the own vehicle V. At this time, the deceleration prediction unit 13 predicts the occurrence of deceleration of the front vehicle VG based on the speed difference between the front vehicle VG and the cut-in vehicle VA and the inter-vehicle distance between the cut-in vehicle VA and the front vehicle VG as in the above conditions (1) and (2). Accordingly, when the cut-in vehicle VA cuts in front of the front vehicle VG, the vehicle control apparatus 1 can more appropriately predict deceleration of the front vehicle VG and control running of the own vehicle V.

In addition, the deceleration prediction unit 13 predicts the occurrence of deceleration of the front vehicle VG in consideration of the inter-vehicle distance between the front vehicle VG (the first preceding vehicle V1) and the own vehicle V as in the above condition (3). Here, a case where the inter-vehicle distance between the front vehicle VG (the first preceding vehicle V1) and the own vehicle V is long, a case where deceleration in the own vehicle V is unnecessary, or the like can be considered. Therefore, the vehicle control apparatus 1 can more appropriately predict the occurrence of deceleration in the front vehicle VG by using the inter-vehicle distance between the front vehicle VG and the own vehicle V.

When the vehicle class of the cut-in vehicle VA is large, the deceleration prediction unit 13 changes the threshold value of each of the above-described conditions so that it is more likely to predict that deceleration will occur in the front vehicle VG than when the vehicle class is small. Accordingly, the deceleration prediction unit 13 can more appropriately predict the occurrence of deceleration in the front vehicle VG in consideration of the ease of occurrence of deceleration in the front vehicle VG due to the vehicle class in the cut-in vehicle VA.

The deceleration prediction unit 13 changes the threshold value of each condition described above so that it is more likely to be predicted that deceleration will occur in the front vehicle VG when the number of the front vehicle VG is large than when the number of the front vehicle VG is small. Accordingly, the deceleration prediction unit 13 can more appropriately predict the occurrence of deceleration of the front vehicle VG (the first preceding vehicle V1) in consideration of the fact that the response to deceleration performed by the leading vehicle becomes slower as the vehicle becomes closer to the rear side in the front vehicle VG.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A vehicle control apparatus that controls traveling of an own vehicle based on a cut-in vehicle that cuts in from an adjacent lane to an own lane on which the own vehicle travels, the vehicle control apparatus comprising:
   an external sensor configured to generate a detection result based on detecting objects around the own vehicle;
   a processor configured to:
   recognize a front vehicle in front of the own vehicle based on the detection result;
   based on the recognition of the front vehicle, detect the cut-in vehicle from the adjacent lane in front of the front vehicle traveling in front of the own vehicle in the own lane;
   predict whether deceleration occurs in the front vehicle based on a speed difference and an inter-vehicle distance between the front vehicle and the cut-in vehicle; and
   generate a control signal to perform acceleration suppression control or deceleration control of the own vehicle when the processor predicts that deceleration will occur,
   wherein the processor is further configured to:
   predict that deceleration occurs in the front vehicle when the speed difference obtained by subtracting a speed of the cut-in vehicle from a speed of the front vehicle is equal to or greater than a predetermined cut-in speed threshold and the inter-vehicle distance between the cut-in vehicle and the front vehicle is equal to or less than a predetermined cut-in distance threshold,
   wherein the front vehicle is composed of a plurality of vehicles running side by side along an extension direction of the own lane, and
   wherein the processor is further configured to decrease the cut-in speed threshold or increase the cut-in distance threshold as a number of vehicles constituting the front vehicle increases; and
   control an actuator to control a speed of the own vehicle based on the control signal.

2. The vehicle control apparatus according to claim 1, wherein the processor is further configured to predict that deceleration occurs in the front vehicle when an inter-vehicle distance between the front vehicle and the own vehicle is equal to or less than a predetermined front distance threshold.

3. The vehicle control apparatus according to claim 1, wherein the processor is further configured to:
   recognizes a vehicle class of the cut-in vehicle,
   decreases the cut-in speed threshold or increases the cut-in distance threshold based on the vehicle class of the cut-in vehicle,
   wherein the vehicle class of the cut-in vehicle is indicative of a size of the cut-in vehicle.

* * * * *